Dec. 30, 1952  R. W. ANNIS  2,624,028
VARIABLE SPEED ALTERNATING CURRENT MOTOR
Filed Aug. 28, 1951  2 SHEETS—SHEET 1
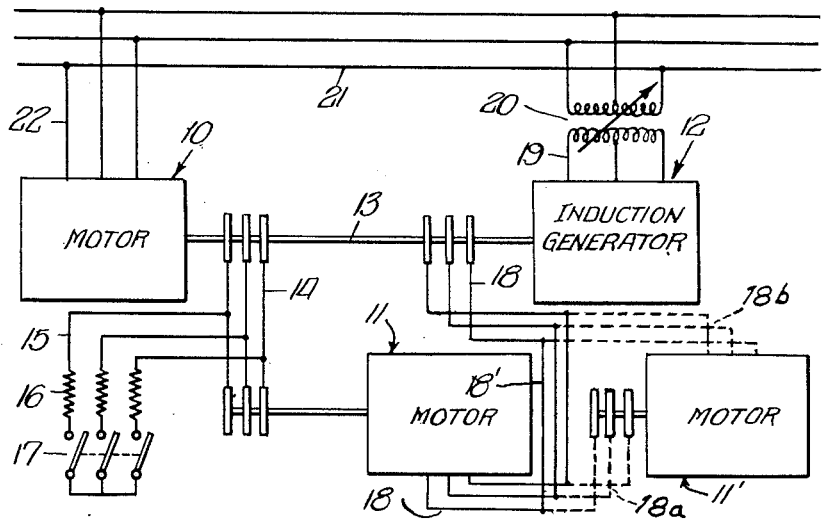
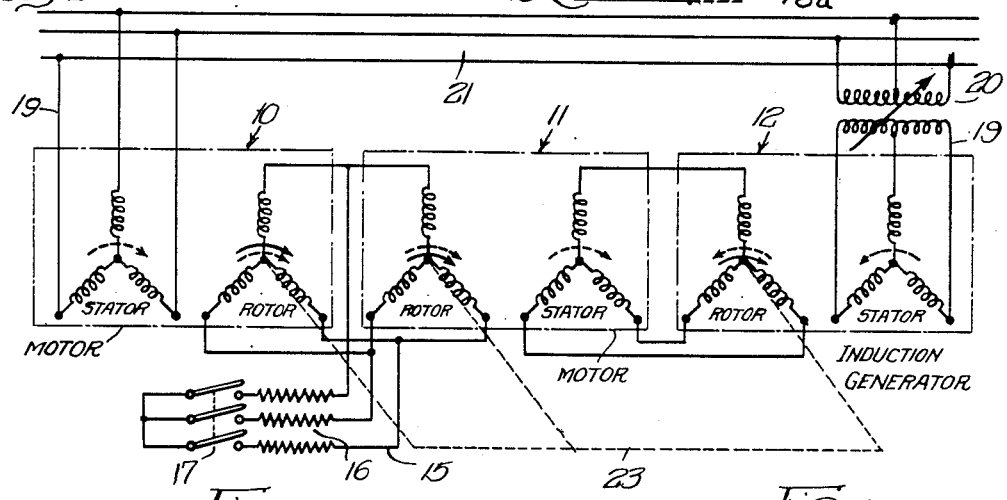
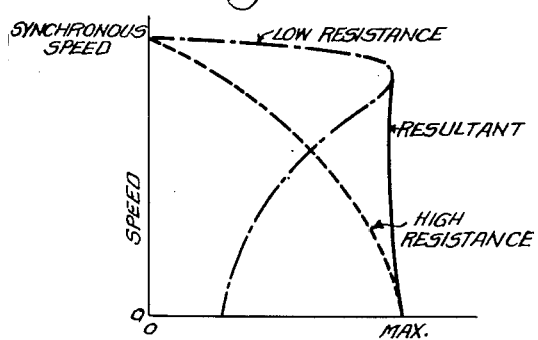
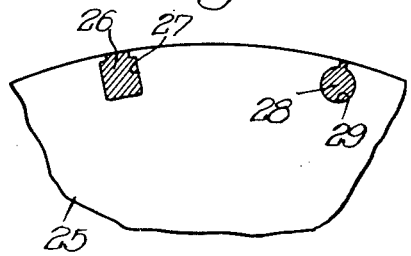
INVENTOR.
Robert W. Annis,
BY
Cromwell, Greist + Warden
attys.

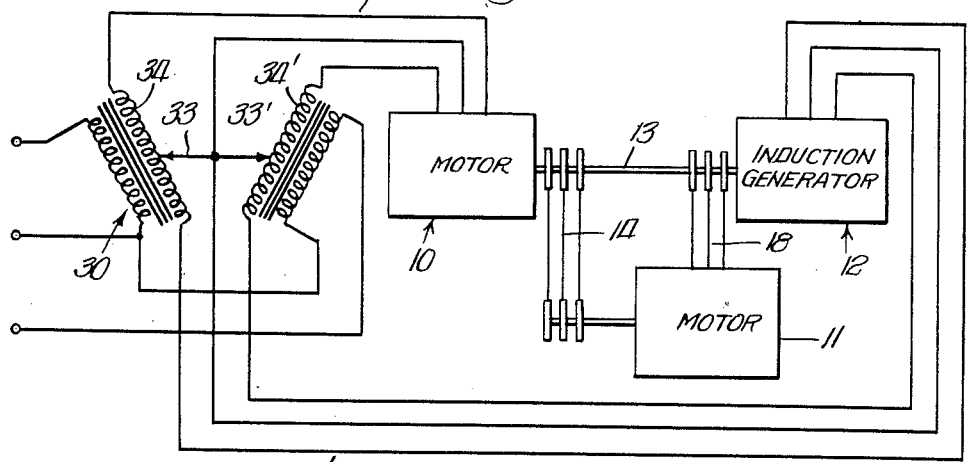
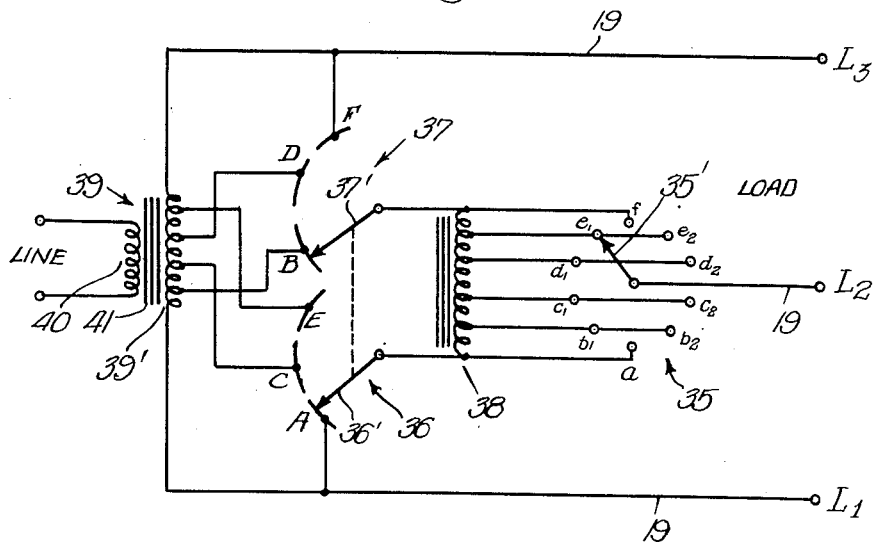

Patented Dec. 30, 1952

2,624,028

UNITED STATES PATENT OFFICE 2,624,028

VARIABLE SPEED ALTERNATING CURRENT MOTOR

Robert W. Annis, Champaign, Ill.

Application August 28, 1951, Serial No. 243,957

10 Claims. (Cl. 318—45)

The present invention pertains to an alternating current induction motor unit having improved means for controlling speed by control of the frequency of the motor rotor circuit.

Various methods of controlling the speed of operation of alternating current machines have heretofore been proposed. Speed change is achieved in accordance with one procedure by changing the number of poles of the motor, using multiple windings or reconnecting of the existing windings of the machine poles. The method results only in an arbitrary increase of the number of fixed speeds of operation, i. e., no flexibility with regard to intermediate speed ranges is made available by pole change. Another method involves the change of the resistance in the rotor circuit of a motor, either by the use of conductors molded in a cast armature or by external windings and slip rings, to which a variable resistance is applied by external means. This method has flexibility but affords poor regulation due to the fact that a varying external load varies the motor slip. Efficiency is diminished by absorption of power in the added resistance.

Still another method of speed control involves the use of a high resistance in the rotor and a two-phase stator, one phase or winding of which operates on fixed line voltage. The voltage of the other stator winding is varied to regulate rotor speed. This method is acceptable for use in the control of speeds of small fractional horse power servo units and the like, however it is impractical for use in larger size installations, say in excess of one horse power motors. This is due to excessive heating from the resistance and high circulating currents which are involved.

Still another method of speed regulation involves the controlling of frequency of rotor circuit E. M. F. This requires a commutator to produce and apply to the rotor winding a frequency differing from its normal operating frequency. The use of commutators is objectionable if for no other reason than the radio interference which they produce.

Other well known methods of speed control are by brush shift, objectionable not only because of its use of a commutator but also its requirement for means to effect mechanical shift of the brushes; and the method of concatenation or cascading. The last named scheme lacks flexibility or versatility, just as does the pole change method.

The present improvements afford 100% flexibility of speed control of a polyphase induction motor by regulation of the rotor voltage frequency, without employing commutation. It avoids other objectionable features such as excessive heating, poor regulation and inefficiency mentioned above, and there are no limitations on its use regarding size of the installation to which it is adapted.

In accordance with a preferred embodiment of the present invention, three polyphase wound rotor induction motors are employed, which may have identical stator and rotor windings, and which bear a predetermined relationship with respect to the number of poles in the respective machines. One of the machines is an induction motor which is to be controlled, another acts as a generator, and the third as a frequency changer. The connections of the machines to one another are such that a change in the voltage applied to the field of the generator, produced by any well known means or, in one adaptation of the invention by an improved auto transformer arrangement, will result in the production of a bucking frequency whose effect, throughout a wide and entirely continuous, flexible range from standstill to synchronous speed, is to alter the speed of rotation of the motor in inverse relation to the change of the generator field voltage.

This method of speed control differs essentially from previous motor frequency control methods in that speed variation stems from variation of the respective motor field frequencies without the use of mechanical commutation. Yet it introduces a problem of low starting torque in the controlled motor, and the improved unit therefor embodies an arrangement to afford the high starting torque of a high resistance rotor circuit, coupled with a flexible range of speed regulation.

It is a general object of the invention to provide a variable speed induction motor control unit of wide and continuous range involving the use of three like induction machines, which is entirely reliable in its regulating action, not being adversely affected by motor torque load or slip change, which does not overheat, does not require commutation, and is not particularly limited, as to practical adaptability, by the size of the installation.

A further object is to provide a speed control unit of the sort referred to in the preceding paragraph which has means to impart improved starting torque, coupled with full flexibility of range in use.

Yet another object is to provide improved means to attain high starting torque in an induction motor, which means is of a character particularly well suited for association with the improved speed control unit, to the end that its inherent flexibility may be enjoyed without sacrifice of other operating quality.

A still further object is to provide an improved auto transformer voltage control unit which is particularly well suited for use in the three-motor variable frequency speed control unit.

Yet another object is to provide the combination of a three-unit motor speed control system as referred to above and the improved auto transformer voltage control unit mentioned in the preceding paragraph.

The foregoing statements are indicative in a general way of the nature of the invention. Other and more specific objects will be apparent to those skilled in the art upon a full understanding of the construction and operation of the device.

Several embodiments of the invention are presented herein for purpose of illustration. It will be appreciated that the invention may be incorporated in other modified forms coming equally within the scope of the appended claims.

In the drawings,

Fig. 1 is a block-type wiring diagram illustrating a speed control system or installation according to one form of the invention, including a proposed means for starting torque control, this view also showing a differential motor drive adaptation of the invention;

Fig. 2 is a schematic wiring diagram illustrating the field and rotor relationships of the three units of the installation in a somewhat modified adaptation thereof, together with the proposed form of starting torque control unit;

Fig. 3 is a fragmentary sectional view illustrating other proposed provisions for obtaining an improved starting torque characteristic, involving redesign of the controlled motor's rotor;

Fig. 4 plots curves comparing the torque characteristic of the subject unit with those of earlier conventional rotor windings;

Fig. 5 is a block-type wiring diagram schematically illustrating a further embodiment of the invention employing an improved auto transformer voltage control unit; and Fig. 6 is a schematic wiring diagram showing transformer connections for a modified installation.

Referring to Fig. 1, a block wiring diagram, the reference numerals 10, 11, 12 designate three like, polyphase wound rotor induction motors which may be assumed to have identical stator and rotor windings. Machines 10 and 12 are mechanically coupled by shaft 13 or equivalent connection, geared or otherwise.

The rotor windings of machines 10, 11 are brush and slip ring connected through the leads 14 and further leads 15 connect the leads 14 to starting torque resistors 16 and a gang switch 17. The field of machine 11, which may act as a motor or simply as a frequency changer, is normally supplied by leads 18, 18′ and a brush and slip ring connection to the rotor of generator machine 12. The leads 18a, 18b shown in dotted line in Fig. 1 are not connected in this normal operating circuit. The field of the machine 12 is supplied through leads 19 from a variable transformer 20, or other conventional variable voltage device, or from the particular auto transformer arrangement which is illustrated in Fig. 6 of the drawings. This transformer is supplied from a standard three-phase alternating current system 21, which is also the source of supply for the field of induction motor 10, through leads 22. The improvement, it should be noted, is adapted to be used in any polyphase system.

The machines 10 and 12 are arranged in such relation that by shorting leads 14, applying voltage to leads 22 and open circuiting leads 19, the shaft 13 will rotate in one direction, whereas when voltage is supplied to leads 19, leads 18 are shorted and leads 22 are open, and the shaft 13 will rotate in the opposite direction. If the normal connections are restored and the applied voltages are equal, the system will be at a standstill except possibly an initial rotation to give a proper angular relationship between the shaft of motor 11 and shaft 13. Transformer action of the machines gives a voltage equilibrium and there are no large circulating currents.

Assuming now that the voltage applied to the field terminals of generator 12 is reduced by manipulation of variable transformer 20, machine 10 will now commence to operate as an induction motor, the direction of rotation of its rotor being in the direction of the electric field of the motor, thereby dropping the frequency of the rotor voltage. The rotor winding frequency is represented by the following slip formula:

$$f_{mr} = f_L - \frac{np}{2}$$

where, $f_{mr}$ is the motor rotor frequency,
$f_L$ is the line voltage frequency,
$n$ is the shaft speed in R. S. P., and
$p$ is the number of motor poles.

The slight modified adaptation of the invention illustrated in Fig. 2 differs from that of Fig. 1 in the fact that all three machines are mechanically coupled by a conventional connection generally designated 23. The rotor of motor 10 is brush and slip ring connected to the rotor of machine 11 and the field winding of machine 11 and rotor of generator 12 are also brush and slip ring connected. Furthermore, the number of poles of machine 11 must equal the sum of the number of poles in the machines 10 and 12, assuming a 1:1:1 speed ratio of the three machines. The electrical operating characteristics of the two installations are generally similar, hence reference may be had to Fig. 2 as an aid in understanding the stator-rotor, field and rotational relationships in the three machines of that embodiment, and also that of Fig. 1. Direction of mechanical rotation of the rotors is indicated by solid line arrows; direction of rotating electric fields is shown by dotted line arrows.

As stated, the frequency in the rotor of motor 10 is equal to the line frequency minus the slip increment due to its rotation in the direction of its field. The frequency in the rotor of machine 11 equals that in the motor rotor winding. Referring to the directional arrows in Fig. 2, the rotary electrical field and mechanical rotation of the frequency changer machine 11 are in the same direction so that the voltage frequency in the stator winding of that unit increases, becoming, by substitution:

$$f_{fr} = f_{mr} + \frac{n2p}{2} = f_L - \frac{np}{2} + np = f_L + \frac{np}{2}$$

where, $f_{fr}$ is the frequency in the rotor of the frequency changer 11.

The frequency of voltage in the rotor of generator 12 is equal to that in the frequency changer stator. Hence, the opposite mechanical rotation of the rotor and rotation of the generator field give the following substituted equation:

$$f_{gs} = f_{fr} - \frac{np}{2} = f_L + \frac{np}{2} - \frac{np}{2} = f_L$$

The frequency of generator stator voltage equals the line frequency, but is in a reverse phase sequence as compared with the motor. As a result, the motor speed may be determined through a relatively wide range by the principle of frequency control, involving control of voltage applied to the generator winding. This may be done by a single voltage regulation at the generator, as by means of variable transformer 20, or the voltage regulation may be performed at both machines 10 and 12, in opposite senses at the respective machines. I have described the action which follows adjustment by reduction of the generator stator voltage. Reversal of direction of rotation may be accomplished by increasing the generator voltage, which, in effect, signifies simply that the units 10, 12 are interchanged with regard to which acts as a motor and which acts as a generator.

In the above, it has been assumed that there is a definite over-all angular relationship between the stator and rotor of machines 10, 11 and 12. A particular case of this relationship is shown in Fig. 2. If unity coupling and no losses for shaft rotation exist, and if equal voltages are applied, the current in leads 19 and 22 will be zero, i. e., there will be no circulating current. If the angular relationship between any two parts is shifted, the equipment will tend to rotate in one direction or the other and lose some effect as a speed control device.

The installation of Fig. 1 further features a modified concatenation of motor 11 and an auxiliary motor 11' preferably of similar nature and operating characteristics. In this installation, leads 18' are omitted and instead the field of machine 11 is brush and slip ring connected through leads 18, 18a (the latter shown in dotted line) to the rotor winding of motor 11'. Likewise, the field of 11' is connected through further leads 18, 18b (the latter shown in dotted line) to the rotor of generator 12. Connection of the motors 11, 11' as illustrated make the same well suited for use as a vehicle differential driving unit, while still performing the function of controlling the speed of the motor 10, as described above. An installation including the motor 10 and differential drive unit 11, 11' provides a motor generator set which has a wide range of utility. The units may be cascaded in series for the driving of a multiplicity of shafts, with differential drive for the two wheels of each shaft.

The foregoing arrangement illustrated in Figs. 1 and 2 produces an induction motor speed control of wide and continuous flexibility over a considerable range from standstill to synchronous speed. Its inherent low starting torque characteristic, due to low resistance of its rotor circuit, would be represented by the curve illustrated in dot-dash line in Fig. 4 of the drawings. On the other hand, the performance curve of a motor having high rotor circuit resistance and poor speed regulation would be represented by the curve shown in dotted line in that figure. By incorporating an auxiliary, switch controlled resistance in the rotor circuit, I combine the advantages of high starting torque and good speed regulation, and obtain the resultant curve shown in solid line in Fig. 4. Switch 17 is closed at the commencement of operation of the system to add the resistance of resistors 16, and is opened when operating speed is attained.

For the same purpose of combining desirable torque-speed control characteristics, I propose to insert a resistance in the armature of a wound rotor motor and, in parallel therewith, an inductance to give an equivalent low resistance in the armature when the motor is near synchronous speed, due to the inverse relationship between rotor speed and rotor winding frequency. At near synchronous speed, rotor frequency approaches zero, therefore the inductive impedance approaches zero or short circuit, and the behavior of the motor resembles that of one whose rotor terminals are short circuited. At low speed the inductance would prevent high impedance, hence the condition across the rotor terminal would appear as though only resistance was present. Accordingly, the motor will act as one with a high resistance rotor, and consequently have high torque at low speed. At intermediate speed, the two effects cross over and high torque is maintained throughout the entire speed range up to synchronous speed.

On induction motors having cast rotors, the effect can be accomplished by the use of two windings, one of a high resistance alloy with low self-inductance in the rotor slot, and the other of low resistance metal with high self-inductance in alternate slots around the rotor periphery. Referring to Fig. 3, there is shown a cast rotor 25 having a winding 26 of low self-inductance material in a slot 27 providing a large air gap. The reference numeral 28 represents a winding of high self-inductance disposed in an alternate slot 29 presenting a very small air gap. Provisions of this sort make it possible to alter the shape of the torque curve to that represented in Fig. 4, using fixed values of resistance and inductance in the rotor circuit, as distinguished from the arrangement of Figs. 1 and 2 employing external resistors.

It is seen from the above that the invention provides a system for obtaining flexible motor speed control, rather than two, or even more, arbitrary selected speeds. An induction motor and induction generator are wired to oppose one another at equal voltage, and a third, similar machine is arranged in the circuit to apply a correcting frequency to the voltage. That machine may also be used as a motor, if desired. The system differs from previous frequency change systems in that the control of motor speed is produced entirely by variation of the machine field and rotor winding voltages, rather than by resort to mechanical commutation.

An alternative embodiment of the control system embodies a transformer voltage control for the motor such as is illustrated in Fig. 5 of the drawing, in which parts and connections corresponding to those shown in Figs. 1 and 2 are designated by corresponding reference numerals. The transformer unit 30 is connected by leads 31, 32 to the stator terminals of the motor 10 and generator 12, respectively, the intermediate machine 11 being related to the motor and generator in the manner described in connection with Fig. 1.

The transformer unit 30 is supplied from a standard A. C. line. Its two contacts arms 33, 33' are mechanically coupled, and adjustment thereof with regard to the secondaries 34, 34' affords a highly desirable fineness of regulation of voltage supply to the generator 12. The field voltage for motor 10 is correspondingly adjusted. This arrangement has the advantage of maintaining current at relatively low value, thereby avoiding the problems in switching which are introduced by high current, and of affording very smooth voltage regulation. The machine arrangement illustrated in Fig. 5 is adapted to be supplied by other transformer arrangements, for example, a transformer arrangement of the type illustrated and described in the patent to Karplus et al. 2,009,013 of July 23, 1935. In order to obtain the fine voltage control of such a unit, without requiring an excessive number of contacts on any component of the system, I propose a transformer connection to the generator 12 as illustrated in Fig. 6.

Referring to Fig. 6, three switches 35, 36, 37 are shown having contact arms 35', 36' and 37' respectively, which are mechanically coupled and driven together. Switch 35 has contacts $a$, $b_1$ and $b_2$, $c_1$ and $c_2$, $d_1$ and $d_2$, $e_1$ and $e_2$, and $f$ arranged in circumferential order as shown, which contacts are adapted to be selectively engaged by the contact arm 35' of switch 35. That contact arm is electrically connected with the center terminal $L_2$ of the three-wire line leading to generator 12.

Contacts $a$ and $f$ are connected to the ends of the coil of a transformer 38 of the type described in the Karplus et al. patent, while the remaining contacts are connected to intermediate taps on the coil. The contacts arms 36', 37' of the switches 36, 37, which arms are operated as a gang, are also electrically connected to the terminals of the coil of transformer 39.

A second transformer 39 has its coil 39' arranged as a secondary associated with a primary winding 40, 41 the primary being supplied from a standard alternating current source. Coil 39' is connected at its ends to the remaining two terminals $L_1$ and $L_3$ for the generator or load. Intermediate taps thereof are connected to contacts of the switches 36, 37. Switch 36 has fixed contacts A, C, E and switch 37 has similar contacts B, D, F. The extreme contacts A and F are connected to the load terminals $L_1$ and $L_3$ while intermediate contacts C and E and B and D are connected to the intermediate taps of coil 39 as described above. The operation of the unit just described is as follows: Commencing with load terminal $L_2$ at the same potential as terminal $L_1$, arms 35' will engage contact $a$ of switch 35, arm 36' will engage contact A and arm 37' will be open circuited. In order to alter the potential of terminal $L_2$ in the direction of that of terminal $L_3$, contact arm 35' is moved clockwise to contact $b_1$, contact arm 36' remaining in engagement with contact A and arm 37' will engage contact B. To further raise the potential of terminal $L_2$, arm 35' is progressively engaged with contacts $c_1$, $d_1$ and $e_1$, while arms 36', 37' retain engagement with contacts A and B, respectively. When arm 35' reaches contact $f$, arm 36' opens circuits. Arm 37' remains in engagement with contact B.

Continuing with the adjustment, arm 35' is next moved to engagement with contact $e_2$, contact arm 36' engages contact C and arm 37' remains in engagement with contact B. This procedure is repeated until the potential of terminal $L_2$ is raised to that of $L_3$. Each time that contact arm 35' engages contact $a$, arm 37' is open circuited and each time arm 35' engages contact $f$, arm 36' is open circuited. Thus it is possible to step the potential of intermediate terminal $L_2$ from that of terminal $L_1$ to that of terminal $L_3$ by the values of the steps of transformer 38. Switches 35, 36 and 37 may be mechanically coupled by gears, non-linear linkages or the like, depending upon the particular design. More units can be cascaded to reduce the number of taps, but this increases the number of switch sections.

Transformer 39 is shown as an isolation transformer but may also be an auto transformer. As an alternative arrangement, the switching may be done by relays to give the above sequence.

The system has the advantage that the cost of transformer 39 may be reduced by reducing the number of taps thereof, the savings being employed for a smaller transformer 38 having additional taps and added switching. The rating of transformer 38 has the same current value as transformer 39, but its voltage is divided by the number of secondary terminals, N, minus one. Thus the K.v.-a. rating of transformer 38 is the K.v.-a. rating of transformer 39 divided by the value N minus one.

If the voltage steps of transformer 38 are small enough a still smoother switching variation may be obtained by the use of a high resistance brush sliding between the contacts of switch 35, engaging two of the contacts of the latter in intermediate position, as described in the Karplus et al. patent identified above.

In an application of the circuit of Fig. 6 to the variable speed motor control described, the primary connections of the transformer may be open delta, or by adding a tertiary winding and auxiliary transformer delta delta X or Y delta X. Primary and tertiary windings of this sort are well known to the art.

I claim:

1. An A. C. motor speed control unit comprising three induction machines, including a machine to be controlled, a second machine having variable means supplying voltage from a source to the field winding thereof, the rotors of said machines being mechanically coupled, and an intermediate machine having means to supply its field winding from the rotor winding of the second machine and further means to electrically connect its rotor winding with that of the first named machine, whereby adjustment of said variable voltage supply means varies the field and rotor winding frequencies of said machines in continuous, flexible manner over a wide range to correspondingly vary the rotor speed of said first named machine.

2. An A. C. motor speed control unit comprising three induction machines, including a machine to be controlled, a second machine having variable means supplying voltage from a source to the field winding thereof, and an intermediate machine having means to supply its field winding from the rotor winding of the second machine and further means to electrically connect its rotor winding with that of the first named machine, the rotors of all three machines being mechanically coupled, whereby adjustment of said variable voltage supply means varies the field and rotor winding frequencies of said machines in continuous, flexible manner over a wide range to correspondingly vary the rotor speed of said first named machine.

3. A unit in accordance with claim 1 in which said variable voltage supply means for the field winding of said second machine includes a transformer having plural secondary coils and plural contact arms mechanically coupled together and electrically engageable with said respective coils, said coils and contact arms being electrically connected to the field winding of said second machine.

4. A unit in accordance with claim 1 in which said variable voltage supply means for the field winding of said second machine includes a transformer having plural secondary coils and plural contact arms mechanically coupled together and electrically engageable with said respective coils, said coils and contact arms being electrically connected to the field winding of said second machine and to the field winding of said machine to be controlled.

5. A unit in accordance with claim 1 in which said variable voltage suply means for the field of said second machine includes a transformer having plural secondary coils, plural contact arms mechanically coupled together, and contacts engaged by said arms which are electrically connected in cascade to said coils.

6. A unit in accordance with claim 1 in which the machine to be controlled is of the cast rotor type having the rotor thereof provided with different windings in alternate, circumferentially spaced slots, one of said windings having high resistance and low self-inductance and the other thereof having low resistance and high self-inductance.

7. A unit in accordance with claim 1 in which the machine to be controlled is of the cast rotor type having the rotor thereof provided with different windings in alternate, circumferentially spaced slots, one of said windings having high resistance and low self-inductance and the other thereof having low resistance and high self-inductance, the slots receiving said first named winding presenting a relatively wide circumferential air gap and those receiving the second named winding presenting a relatively small air gap.

8. An A. C. motor speed control unit comprising three induction machines, including a machine to be controlled, a second machine having variable means supplying voltage from a source to the field winding thereof, the rotors of said machines being mechanically coupled, and an intermediate machine having means to supply its field winding from the rotor winding of the second machine and further means to electrically connect its rotor winding with that of the first named machine, whereby adjustment of said variable voltage supply means varies the field and rotor winding frequencies of said machines in continuous, flexible manner over a wide range to correspondingly vary the rotor speed of said first named machine, and means to regulate the voltage in the electrical connection of the rotors of said intermediate and first machines.

9. An A. C. motor speed control unit comprising a machine to be controlled, a second machine having variable means supplying voltage from a source to the field winding thereof, the rotors of said machines being mechanically coupled, a third machine having means to electrically connect its rotor winding with that of the first named machine, and a fourth machine having its field winding supplied from the rotor of the second machine and its rotor winding connected to the field winding of said third machine to constitute said third and fourth machines, a concatenated differential motor drive unit.

10. An A. C. motor speed control unit comprising three induction machines, including a machine to be controlled, a second machine having variable means supplying voltage from a source to the field winding thereof, the rotors of said machines being mechanically coupled, and an intermediate machine having means to supply its field winding from the rotor winding of the second machine and further means to electrically connect its rotor winding with that of the first named machine, the rotor of said intermediate machine being mechanically coupled to those of said first and second machines, whereby adjustment of said variable voltage supply means varies the field and rotor winding frequencies of said machines in continuous, flexible manner over a wide range to correspondingly vary the rotor speed of said first named machine, and means to regulate the voltage in the electrical connection of the rotors of said intermediate and first machines.

ROBERT W. ANNIS.

No references cited.